United States Patent
Kresse et al.

(10) Patent No.: US 8,617,028 B2
(45) Date of Patent: Dec. 31, 2013

(54) SYSTEM FOR MANAGING TORQUE IN A VEHICLE DRIVELINE COUPLED TO AN INTERNAL COMBUSTION ENGINE AND AN ELECTRIC MOTOR

(75) Inventors: John Kresse, Martinsville, IN (US); Jeffrey Runde, Fishers, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 1195 days.

(21) Appl. No.: 12/508,309

(22) Filed: Jul. 23, 2009

(65) Prior Publication Data

US 2011/0021310 A1    Jan. 27, 2011

(51) Int. Cl.
*B60W 10/02* (2006.01)
(52) U.S. Cl.
USPC .......... 477/5; 477/70; 477/73; 477/107; 477/115; 701/22; 701/53; 701/54; 701/55; 701/56; 701/67; 701/68
(58) Field of Classification Search
USPC ........ 477/5, 70, 73, 107, 115; 701/22, 53, 54, 701/55, 56, 67, 68
See application file for complete search history.

(56) References Cited

U.S. PATENT DOCUMENTS

| | | |
|---|---|---|
| 6,490,511 B1 | 12/2002 | Raftari et al. |
| 2002/0052677 A1 | 5/2002 | Lasson et al. |
| 2004/0000887 A1 | 1/2004 | Lim |
| 2004/0174124 A1 | 9/2004 | Lee |

OTHER PUBLICATIONS

International Search Report for PCT/US2010/40303, dated Aug. 30, 2010, (9 pages).

*Primary Examiner* — Derek D Knight
(74) *Attorney, Agent, or Firm* — Barnes & Thornburg LLP

(57) ABSTRACT

A system is provided for managing torque in a vehicle driveline coupled to an internal combustion engine and to a hybrid motor/generator. An engine control circuit provides to a transmission control circuit an engine torque value corresponding to torque applied by the engine to the driveline. A hybrid control circuit provides to the transmission control circuit a motor torque value corresponding to torque applied by the hybrid motor/generator to the driveline. The transmission control circuit controls operation of at least one friction device and controls shifting of the transmission, and also manages torque applied to the drive line by the engine and by the hybrid motor/generator based on the engine torque value and the motor torque value such that the friction device control and shift schedule instructions do not require modification to accommodate inclusion of the hybrid motor/generator in the system or exclusion of the hybrid motor/generator from the system.

25 Claims, 4 Drawing Sheets

SYSTEM FOR MANAGING TORQUE IN A VEHICLE DRIVELINE COUPLED TO AN INTERNAL COMBUSTION ENGINE AND AN ELECTRIC MOTOR

FIELD OF THE INVENTION

The present invention relates generally to so-called hybrid vehicle systems in which driveline torque can be supplied by either or a combination of an internal combustion engine and an electric motor, and more specifically to systems for managing vehicle driveline torque in such hybrid vehicle systems.

BACKGROUND

So-called hybrid systems for motor vehicles typically include one or more electric motors that are configured and arranged to apply torque, e.g., positive or negative, to the vehicle driveline in place of or in addition to torque applied by an internal combustion engine. It is desirable to manage torque applied by the two or more sources in such hybrid systems.

SUMMARY

The present invention may comprise one or more of the features recited in the attached claims, and/or one or more of the following features and combinations thereof. A system for managing torque in a vehicle driveline coupled to an internal combustion engine and to a hybrid motor/generator may comprise a transmission defining at least part of the vehicle driveline, wherein the transmission includes at least one electronically controllable friction device, a transmission control circuit configured to control operation of the transmission, an engine control circuit configured to control operation of the engine, and a hybrid control circuit configured to control operation of the hybrid motor/generator. The engine control circuit may include a memory having instructions stored therein that are executable by the engine control circuit to provide to the transmission control circuit an engine torque value corresponding to torque applied by the engine to the driveline. The hybrid control circuit may include a memory having instructions stored therein that are executable by the hybrid control circuit to provide to the transmission control circuit a motor torque value corresponding to torque applied by the hybrid motor/generator to the driveline. The transmission control circuit may include a memory having stored therein friction device control and shift schedule instructions that are executable by the transmission control circuit to control operation of the at least one friction device and to control shifting of the transmission respectively, and may also have stored therein instructions that are executable by the transmission control circuit to manage torque applied to the drive line by the engine and by the hybrid motor/generator based on the engine torque value and the motor torque value such that the friction device control and shift schedule instructions do not require modification to accommodate inclusion of the hybrid motor/generator in the system or exclusion of the hybrid motor/generator from the system.

In one embodiment, at least two of the transmission control circuit, the engine control circuit and the hybrid control circuit are combined to form a single controller. Alternatively or additionally, the system may further comprise a communications link coupled to each of the engine control circuit, the transmission control circuit and the hybrid control circuit. In this embodiment, the engine control circuit, the transmission control circuit and the hybrid control circuit may each be configured to communicate with at least one other of the engine control circuit, the transmission control circuit and the hybrid control circuit via the communications link.

The instructions stored in the memory of the transmission control circuit may include instructions that are executable by the transmission control circuit to determine and provide a motor torque limit value to the hybrid control circuit when the transmission control circuit determines that the torque produced by the hybrid motor/generator should be reduced. The instructions stored in the memory of the hybrid control circuit may include instructions that are executable by the hybrid control circuit to limit torque applied by the hybrid motor/generator to the driveline in accordance with the motor torque limit value.

The instructions stored in the memory of the transmission control circuit may include instructions that are executable by the transmission control circuit to determine and provide an engine torque limit value to the engine control circuit when the transmission control circuit determines that the torque produced by the engine should be reduced. The instructions stored in the memory of the engine control circuit may include instructions that are executable by the engine control circuit to limit torque applied by the engine to the driveline in accordance with the engine torque limit.

The instructions stored in the memory of the transmission control circuit may include instructions that are executable by the transmission control circuit to process the engine torque value and determine a driver demanded node torque value corresponding to torque applied to point in the driveline to which the hybrid motor/generator is coupled, and to provide the driver demanded node torque value to the hybrid control circuit. The instructions stored in the memory of the hybrid control circuit may include instructions that are executable by the hybrid control circuit to control the hybrid motor/generator to apply torque to the driveline and to determine a torque adjustment value based on the node torque value, the torque adjustment value corresponding to an amount of torque by which the torque produced by the engine should be modified to take into account the torque being applied by the hybrid motor/generator to the driveline, and to provide the torque adjustment value to the transmission control circuit. The instructions stored in the memory of the transmission control circuit may include instructions that are executable by the transmission control circuit to process the torque adjustment value to determine a corresponding engine torque limit or command, and to provide the engine torque limit or command to the engine control circuit. The instructions stored in the memory of the engine control circuit may include instructions that are executable by the engine control circuit to control torque applied by the engine to the driveline in accordance with the engine torque limit or command.

The engine may include a rotatable output shaft that is driven by the engine and that is coupled to a rotatable input shaft of the transmission, and the hybrid motor/generator may include a hybrid motor/generator coupled to the driveline at the input shaft of the transmission. Alternatively or additionally, the transmission may include a power take off gear, and the hybrid motor/generator may include a hybrid motor/generator coupled to the driveline at the power take off gear. Alternatively or additionally still, the transmission may include a rotatable output shaft, and the hybrid motor/generator may include a hybrid motor/generator coupled to the driveline at the output shaft of the transmission.

A system for managing torque in a vehicle driveline coupled to an internal combustion engine and to a hybrid motor/generator may comprise a transmission defining at least part of the vehicle driveline, a transmission control circuit configured to control operation of the transmission, an engine control circuit configured to control operation of the engine, and a hybrid control circuit configured to control operation of the hybrid motor/generator. The engine control circuit may include a memory having instructions stored therein that are executable by the engine control circuit to provide to the transmission control circuit an engine torque value corresponding to torque applied by the engine to the driveline. The transmission control circuit may receive one or more torque limit requests from one or more systems other than the hybrid control circuit. The transmission control circuit may include a memory having instructions stored therein that are executable by the transmission control circuit to determine a modified engine torque value based on the engine torque value and the one or more torque limit requests, and to control operation of the transmission in accordance with the modified engine torque value.

In one embodiment, at least two of the transmission control circuit, the engine control circuit and the hybrid control circuit are combined to form a single controller. Alternatively or additionally, the system may further comprise a communications link coupled to each of the engine control circuit, the transmission control circuit and the hybrid control circuit. In this embodiment, the engine control circuit, the transmission control circuit and the hybrid control circuit may each be configured to communicate with at least one other of the engine control circuit, the transmission control circuit and the hybrid control circuit via the communications link.

The instructions stored in the memory of the transmission control circuit may include instructions that are executable by the transmission control circuit to process the modified engine torque value and determine a node torque value corresponding to torque applied to the point in the driveline to which the hybrid motor/generator is coupled, and to provide the node torque value to the hybrid control circuit. The instructions stored in the memory of the hybrid control circuit may include instructions that are executable by the hybrid control circuit to control the hybrid motor/generator to apply torque to the driveline and to determine a torque adjustment value based on the node torque value, the torque adjustment value corresponding to an amount of torque by which the torque produced by the engine should be modified to take into account the torque being applied by the hybrid motor/generator to the driveline, and to provide the torque adjustment value to the transmission control circuit. The instructions stored in the memory of the transmission control circuit may include instructions that are executable by the transmission control circuit to process the torque adjustment value to determine a corresponding engine torque limit or command, and to provide the engine torque limit or command to the engine control circuit. The instructions stored in the memory of the engine control circuit may include instructions that are executable by the engine control circuit to control torque applied by the engine to the driveline in accordance with the engine torque limit or command.

The instructions stored in the memory of the transmission control circuit may include instructions that are executable by the transmission control circuit to determine and provide a motor torque limit value to the hybrid control circuit when the transmission control circuit determines that the torque produced by the hybrid motor/generator should be reduced. The instructions stored in the memory of the hybrid control circuit include instructions that are executable by the hybrid control circuit to limit torque applied by the hybrid motor/generator to the driveline in accordance with the motor torque limit value.

A system for managing torque in a vehicle driveline coupled to an internal combustion engine and to a hybrid motor/generator may comprise a transmission defining at least part of a vehicle driveline to which the engine and hybrid motor/generator are coupled, an accelerator pedal responsive to driver control to produce an accelerator pedal position signal relative to a reference accelerator pedal position, an engine control circuit configured to control operation of the engine and including an input receiving the accelerator pedal position signal, a transmission control circuit configured to control operation of the transmission, and a hybrid control circuit configured to control operation of the hybrid motor/generator. The engine control circuit may include a memory having instructions stored therein that are executable by the engine control circuit to process the accelerator pedal position signal and to provide a corresponding accelerator pedal position value to the transmission control circuit and to the hybrid control circuit. The hybrid control circuit may include a memory having instructions stored therein that are executable by the hybrid control circuit to process the accelerator pedal position value to produce and provide to the transmission control circuit a modified accelerator pedal position value when the hybrid motor/generator is operating in a battery recharging mode. The transmission control circuit may include a memory having stored therein instructions that are executable by the transmission control circuit to control operation of the transmission in accordance with the modified accelerator pedal position value when the hybrid motor/generator provides the reduced accelerator pedal position value thereto and to otherwise control operation of the transmission in accordance with the accelerator pedal position value provided by the engine control circuit.

A system for controlling operation of a transmission in a vehicle including an internal combustion engine and a hybrid motor/generator may comprise a transmission defining at least part of a vehicle driveline to which the engine and hybrid motor/generator are coupled, a transmission control circuit configured to control operation of the transmission, an engine control circuit configured to control operation of the engine, and a hybrid control circuit configured to control operation of the hybrid motor/generator. The engine control circuit may include a memory having instructions stored therein that are executable by the engine control circuit to determine and provide to the transmission control circuit an engine torque value corresponding to torque applied by the engine to the driveline. The transmission control circuit may include a memory having stored therein instructions that are executable by the transmission control circuit to determine from the engine torque value and provide to the hybrid control circuit a node torque value corresponding to torque applied to the point in the driveline to which the hybrid motor/generator is coupled. The hybrid control circuit may include a memory having instructions stored therein that are executable by the hybrid control circuit to determine a motor torque value corresponding to an amount of motor torque applied by the hybrid motor/generator, and to determine from the motor torque value and the node torque value a torque adjustment value corresponding to an amount of torque by which the engine torque value should be modified to account for the amount of motor torque applied by the hybrid motor/generator, and to provide the torque adjustment value to the transmission control circuit. The instructions stored in the memory of the transmission control circuit may include instructions that are executable by the transmission control circuit to process the torque adjustment value to determine a corresponding engine torque limit or command and to provide to the engine control circuit the engine torque limit or command.

The instructions stored in the memory of the engine control circuit may include instructions that are executable by the engine control circuit to modify the torque applied by the engine to the driveline in accordance with the engine torque limit or command.

The engine may include a rotatable output shaft that is driven by the engine and that is coupled to a rotatable input shaft of the transmission, and the hybrid motor/generator may include a hybrid motor/generator coupled to the driveline at the input shaft of the transmission. Alternatively, the transmission may include a power take off gear, and the hybrid motor/generator may include a hybrid motor generator coupled to the driveline at the power take off gear. Alternatively still, the transmission may include a rotatable output shaft, and the hybrid motor/generator may include a hybrid motor/generator coupled to the driveline at the output shaft of the transmission.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
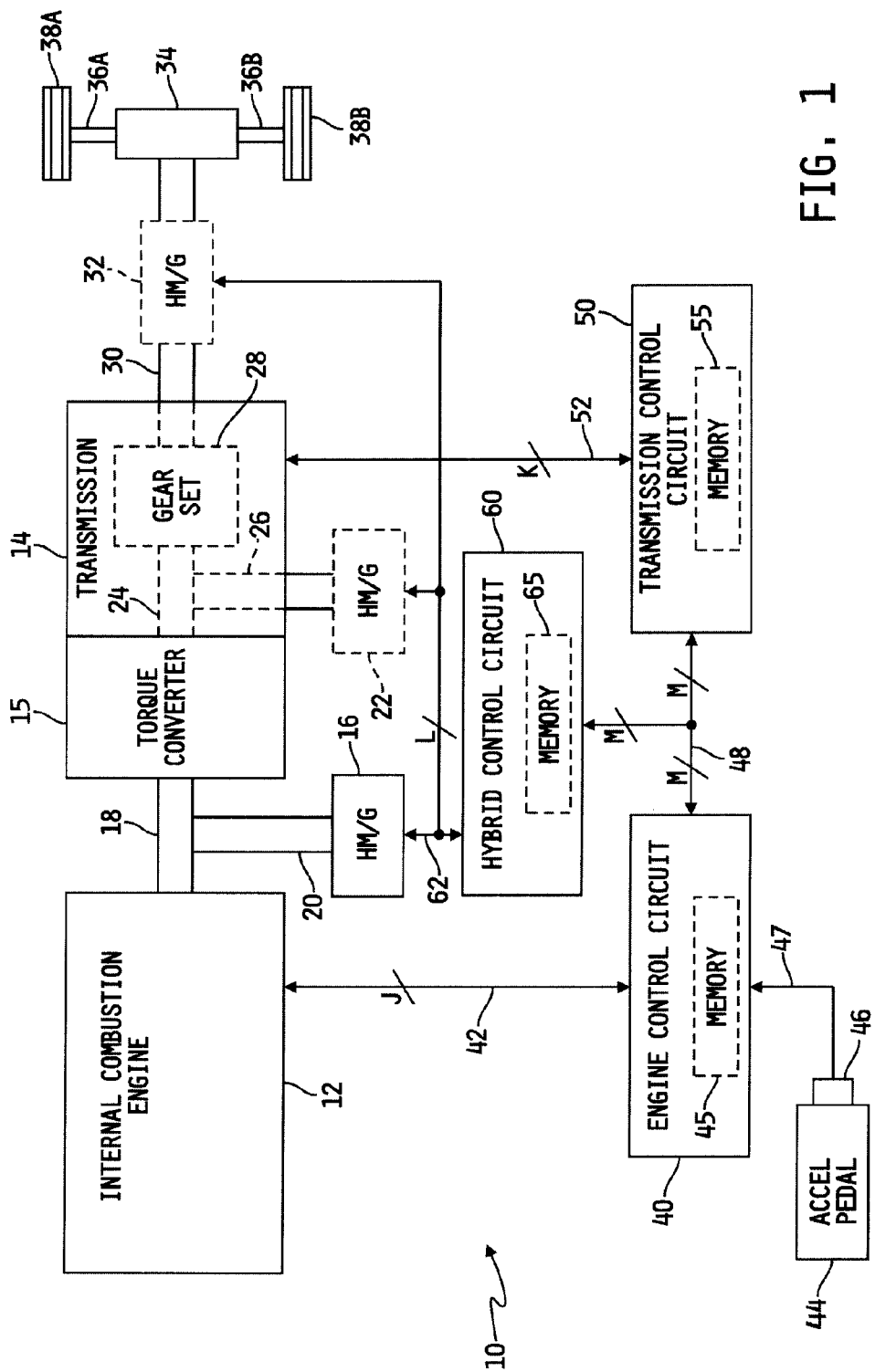
FIG. 1 is a diagram of one illustrative embodiment of a system for managing torque in a vehicle driveline, including a transmission coupled to an internal combustion engine and to at least one electric motor/generator.

Referring now to FIG. 1, a block diagram and schematic view is shown of one illustrative embodiment of a system 10 for managing torque in a vehicle driveline that includes a transmission 14 operatively coupled to an internal combustion engine 12 and also to at least one electric motor/generator 16. In the illustrated embodiment, the internal combustion engine 12 is conventional and is configured in a conventional manner to rotatably drive an output shaft 18. The output shaft 18 is also the input shaft of the transmission 14. The illustrated transmission 14 includes a conventional torque converter 15, which includes a conventional lockup clutch that is operable in a conventional manner. The torque converter 15 may alternatively be separate from the transmission 14 or be replaced by one or more other components acting as an interface between the engine 12 and transmission 14. In the illustrated embodiment, a conventional hybrid motor/generator 16, i.e., an electrically rechargeable or regenerating motor, is coupled to the input shaft 18 of the transmission via a rotatable shaft 20, whereby the hybrid motor/generator may apply torque (positive and/or negative) to the input shaft 18.

Alternatively or additionally, another conventional hybrid motor/generator 22 may be coupled via a rotatable shaft 26 to a turbine shaft 24 that is rotatably connected between the torque converter 15 and a conventional gear set 28, e.g., a planetary or other conventional gear set. In embodiments that do not include, or include a separate, torque converter 15, the shaft 24 may be the input shaft to the transmission 14. In any case, in embodiments that include the hybrid motor/generator 22, the hybrid motor/generator 22 is configured to apply torque (positive and/or negative) to the rotatable shaft 24. Alternatively or additionally still, yet another conventional hybrid motor/generator 32 may be coupled in-line to an output shaft 30 of the transmission 14. In the illustrated embodiment, the transmission output shaft 30 is coupled to a conventional differential 34 that is further coupled via rotatable shafts 36A, 36B to conventional wheels 38A, 38B of the vehicle carrying the system 10. In any case, in embodiments that include the hybrid motor/generator 32, the hybrid motor/generator 32 is configured to apply torque (positive and/or negative) to the rotatable shaft 30.

For purposes of this document, the term "driveline" will be understood to include all components driven by the engine 12 between the output shaft 18 of the engine 12 and the differential 34. While the driveline in the embodiment of the system 10 illustrated in FIG. 1 includes a transmission 14, transmission input shaft 18, transmission shaft 30, those skilled in the art will recognize that additional components may be included in the vehicle driveline, examples of which include, but should not be limited to, one or more additional transmissions, torque converters, and the like.

The system 10 further includes a number of control circuits configured to control the various components of the system 10. For example, the system 10 includes an engine control circuit 40 that is electrically connected to various sensors and actuators (not shown) of the engine 12 via a number, J, of signal paths 42, wherein J may be any positive integer. The engine control circuit 40 is illustratively microprocessor-based, and includes a memory 45 having instructions stored therein that are executable by the engine control circuit 40 to control operation of the engine 12 in a conventional manner. It will be understood, however, that this disclosure contemplates other embodiments in which some or all of the engine control circuit 40 is not microprocessor-based, and which is configured to control operation of the engine 12 based on one or more sets of hardwired instructions and/or software instructions stored in the memory unit 45.

A conventional accelerator pedal 44 includes an accelerator pedal sensor 46 that is also electrically connected to the engine control circuit 40 via a signal path 47. The accelerator pedal sensor 46 may be conventional, and is generally operable to produce an accelerator pedal position signal on the signal path 47 that is indicative of a position of the accelerator pedal 44 relative to a reference position. The instructions stored in the memory 45 of the engine control circuit 40 include conventional instructions that are executable by the engine control circuit 40 to process the accelerator pedal position signal produced by the accelerator pedal sensor 46 to determine a corresponding accelerator pedal position value.

The system 10 further includes a transmission control circuit 50 that is electrically connected to various sensors and actuators (not shown) of the transmission via a number, K, of signal paths 52, wherein K may be any positive integer. Example actuators include, but are not limited to, at least one electrically controllable friction device and a number of automatically selectable gear ratios. The transmission control circuit 50 includes a memory 55 having instructions stored therein that are executable by the transmission control circuit 50 to generally control operation of the torque converter 15 and to generally control operation of the transmission 14. For example, the memory 55 includes instructions that are executable by the transmission control circuit 50 to control operation of the at least one friction device and changing between the various gear ratios, e.g., in accordance with one or more conventional shift schedules stored in the memory 55. The transmission control circuit 50 is illustratively microprocessor-based, although it will be understood that this disclosure contemplates other embodiments in which the transmission control circuit 50 is not microprocessor-based, but is configured to control operation of the torque converter 15 and/or transmission 14 based on one or more sets of hardwired instructions and/or software instructions stored in the memory unit 55.

The system 10 further includes a hybrid control circuit 60 that is electrically connected to the hybrid motor/generator 16, in embodiments of the system 10 that include the hybrid motor/generator 16, to the hybrid motor/generator 22, in embodiments of the system 10 that include the hybrid motor/generator 22, and/or to the hybrid motor generator 32, in embodiments of the system 10 that include the hybrid motor/generator 32, via a number, L, signal paths 62, wherein L may be any positive integer. The hybrid control circuit 60 includes a memory 65 having instructions stored therein that are executable by the hybrid control circuit 60 to control operation of the one or more hybrid motors/generators 16, 22 and/or 32, and to provide information to the engine control circuit 40 and the transmission control circuit 50. The hybrid control circuit 60 is illustratively microprocessor-based, although it will be understood that this disclosure contemplates other embodiments in which the hybrid control circuit 60 is not microprocessor-based, but is configured to control operation of the one or more hybrid motors/generators 16, 22 and/or 32 based on one or more sets of hardwired instructions and/or software instructions stored in the memory unit 65.

In the illustrated embodiment, the engine control circuit 40, the transmission control circuit 50 and the hybrid control circuit 60 each have a communication port, and the communication ports of the circuits 40, 50 and 60 are electrically connected together via number, M, of signal paths 48, wherein M may be any positive integer. The number of signal paths 48 is typically referred to collectively as a data link. Generally, the engine control circuit 40, the transmission control circuit 50 and the hybrid control circuit 60 are operable to share information via the one or more signal paths 48 in a conventional manner. In one embodiment, for example, the engine control circuit 40, the transmission control circuit 50 and the hybrid control circuit 60 are operable to share information via the one or more signal paths 48 in the form of one or more messages accordance with a society of automotive engineers (SAE) J-1939 communications protocol, although this disclosure contemplates other embodiments in which the engine control circuit 40, the transmission control circuit 40 and the hybrid control circuit 60 are operable to share information via the one or more signal paths 48 in accordance with one or more other conventional communication protocols. In alternative embodiments, two or more of the engine control circuit 40, transmission control circuit 50 and the hybrid control circuit 60 may be combined to form a single controller. As one specific example, which should not be considered limiting in any way, the transmission control circuit 50 and the hybrid control circuit 60 may be combined to form a single controller. Other combinations of two or more of the engine control circuit 40, the transmission control circuit 50 and the hybrid control circuit 60 are contemplated by this disclosure.

As it relates to this disclosure, the transmission control circuit 50 is operable to receive certain operating information relating to operation of the engine 12 from the engine control circuit 40 and to receive certain operating information relating to the operation of the one or more hybrid motors/generators 16, 22 and/or 32, as will be described in greater detail hereinafter, all via the one or more signal paths 48 in a conventional manner. The transmission control circuit 50 is further operable, as will be described in further detail hereinafter, to process information received from the engine control circuit 40 and/or from the hybrid control circuit 60, and issue control commands or messages to the engine control circuit 40 and/or the hybrid control circuit 60 via the one or more signal paths 48 to control operation of the engine 12 and/or the one or more hybrid motors/generators 16, 22, 32 respectively in accordance therewith. The hybrid control circuit 60 is also operable to receive certain operating information relating to operation of the engine 12 from the engine control circuit 40, to process information received from the engine control circuit 40, and to issue corresponding control commands or messages to the transmission control circuit 50 via the one or more signal paths 48.

Figure 2:
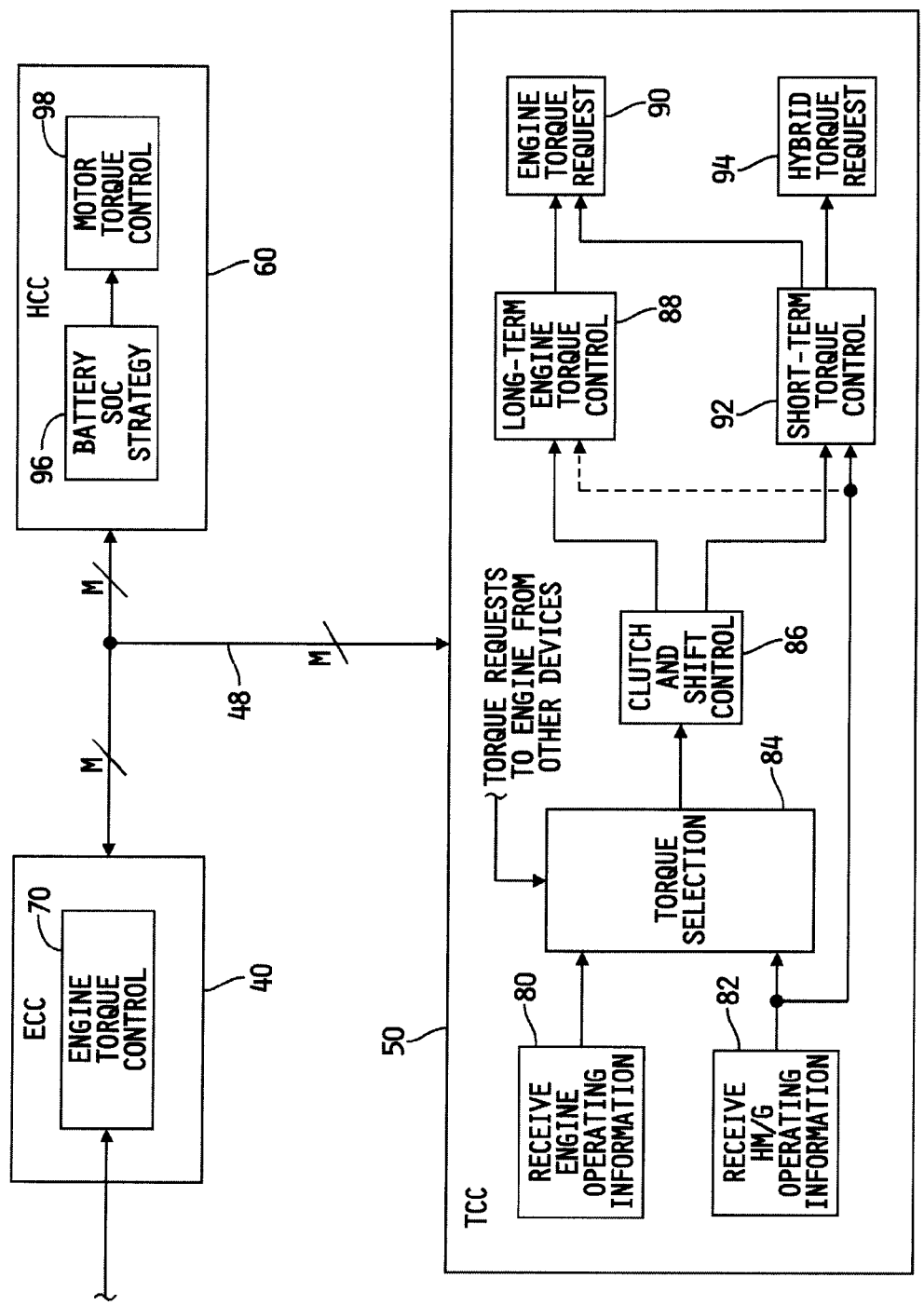
FIG. 2 is a block diagram illustrating some of the control structures within each of the engine control circuit, transmission control circuit and hybrid motor/generator control circuit illustrated in FIG. 1.

Referring now to FIG. 2, a block diagram is shown illustrating some of the control structures within each of the engine control circuit (ECC) 40, the transmission control circuit (TCC) 50 and the hybrid control circuit (HCC) 60 illustrated in FIG. 1. Each of the control structures illustrated in FIG. 2 illustratively represents control logic, e.g., in the form of instructions that are stored in the memory of the respective control circuit and that are executable by the respective control circuit to perform the described functions. In the illustrated embodiment, for example, the engine control circuit 40 includes a conventional engine torque control block 70 that is operable to control output torque produced by the engine 12 as a function of a number of engine operating conditions, and that is operable to limit output torque produced by the engine 12 based on one or more internally and/or externally produced torque limit commands or requests.

In the illustrated embodiment, the transmission control circuit 50 includes a number of control blocks for controlling operation of the transmission 14. For example, the transmission control circuit 50 includes an engine information processing block 80 that receives, e.g., periodically, engine operating information from the engine control circuit 40 relating to operating conditions of the engine 12. The transmission control circuit 50 further includes a hybrid system information processing block 82 that receives, e.g., periodically, hybrid system operating information from the hybrid control circuit 60 that corresponds to operating conditions of the one or more hybrid motors/generators 16, 22, 32. Torque-related information received by the information processing blocks 80 and 82, e.g., one or more torque values, requests and/or limits, is provided to a torque selection block 84. Additional torque-related information, e.g., one or more torque requests and/or torque limit commands, generated internally and/or from other devices or systems may also be received by the torque selection block 84 as illustrated in FIG. 2. Examples of external devices or systems that may produce and provide torque requests and/or torque limits to the transmission control circuit 40 include, but are not limited to, anti-lock braking system, traction control system, headway controller system, adaptive cruise control system, roll stability system, or the like. Such externally produced torque requests or limits may be provided directly to the transmission control circuit 50, e.g., via the communications link 48 or other suitable input, or may alternatively be provided via the engine control circuit 40 and/or the hybrid control circuit 60 via the communications link 48. In any case, the torque selection block 84 is configured to process the received torque-related information and produce as an output a selected one of the received input torque values, requests and/or limits. The selection logic within the torque selection block 84 may be, for example, a conventional least-wins control strategy, although other selection strategies may alternatively be used. An example of one alternative selection strategy is, but should not be limited to, a strategy that ranks the various torque values, requests and/or limits in order of importance and then chooses an appropriate torque value based on its relative level of importance.

The transmission control circuit 50 further includes a clutch and shift control block 86 that is configured to receive the torque output from the torque selection block 84 and control operation of one or more friction devices, e.g., clutches, in the transmission, and that is further configured to control shifting between the plurality of gear ratios of the transmission according to one or more shift schedules. Because the transmission control circuit 50 is configured as described herein to control torque blending between the engine 12 and the one or more hybrid motors/generators 16, 22, 32, the clutch and shift control block 86 may be the same logic, e.g., instructions, used when the transmission 14 is driven only by the engine 12. In other words, because the transmission control circuit 50 controls and manages torque output by the engine 12 and one or more hybrid motor/generators 16, 22, 32, the clutch and shift control logic used when the transmission 14 is being driven only by the engine need not be modified in order to accommodate any one or more of the hybrid motor/generators. Thus, the friction device control and shift schedule instructions in the clutch and shift control logic block 86 do not require modification to accommodate inclusion of the hybrid motor/generator 16, 22, and/or 32 in the system 10 or exclusion of the hybrid motor/generator 16, 22 and/or 32 from the system 10, i.e., in either case the friction device control and shift schedule instructions may remain the same.

The transmission control circuit 50 further includes long-term and short term torque control logic blocks 88 and 92 that are configured to receive shift-based torque information from the clutch and shift control logic block 86. The long-term engine torque control logic block 88 is configured to process the shift-based torque information received from the clutch and shift control logic block 86 and produce one or more long-term engine torque requests and/or engine torque limits. In some embodiments, e.g., such as in embodiments in which the hybrid motor/generator is large enough to provide all propulsive torque for one or more operating conditions, the long-term engine torque control logic block 88 may receive hybrid motor/generator operating information from the hybrid motor/generator operating block 82 as shown in FIG. 2 by dashed-line representation. In such embodiments, the long-term engine torque control logic block 88 is configured to process the hybrid motor/generator operating information received from the hybrid motor/generator operating information block 82 and produce one or more long-term engine torque requests and/or engine torque limits. In any case, the one or more long-term engine torque requests and/or limits are provided to an engine torque request block 90 that transmits the one or more long-term engine torque requests and/or limits to the engine control circuit 40 via the communications link 48. The short-term torque control logic block 92 is configured to process the shift-based torque information received from the clutch and shift control logic block 86, and/or to process hybrid motor/generator operating information received from the hybrid motor/generator operating information block 82, and produce one or more short-term torque requests and/or torque limits. The one or more short-term torque requests and/or limits are provided to either one or both of the engine torque request block 90 and a hybrid torque request block 94. The one or more short-term torque requests and/or limits may be or include one or more engine torque requests and/or limits, and may alternatively or additionally be or include one or more hybrid motor/generator torque requests and/or limits. Any short-term engine torque requests and/or limits are transmitted by the engine torque request block 90 to the engine control circuit 40, and any short-term hybrid motor/generator torque requests and/or limits are transmitted by the hybrid torque request block 94 to the hybrid control circuit 60.

In the illustrated embodiment, the hybrid control circuit 60 includes a battery state-of-charge (SOC) strategy block 96 that is configured to determine, control and manage the state of charge of one or more batteries connected to the hybrid motor/generator 16, 22 and/or 32. An output of the battery SOC strategy block 96 provides one or more torque commands to a motor torque control block 98. Generally, the battery SOC strategy block 96 and motor torque control blocks 98 are configured to determine the current state of charge of the one or more batteries connected to the hybrid motor/generator 16, 22 and/or 32, and to control positive torque produced by the hybrid motor/generator 16, 22, and/or 32, e.g. torque applied by the hybrid motor/generator 16, 22 and/or 32 to the driveline, and/or negative torque applied to the hybrid motor/generator 16, 22, and/or 32, e.g., torque required by hybrid motor/generator 16, 22 and/or 32 to regenerate or charge the one or more batteries connected thereto.

As briefly described with respect to FIG. 2, the transmission control circuit 50 is configured to manage and control the blending of torque applied by the engine 12 and by the hybrid motor/generator 16, 22 and/or 32 to the vehicle driveline such that the friction device control, e.g., clutch control, and shift schedule instructions do not require modification to accommodate inclusion of the hybrid motor/generator 16, 22, and/or 32 in the system 10 or exclusion of the hybrid motor/generator 16, 22 and/or 32 from the system 10. The transmission control circuit 50 accomplishes this by receiving torque requests and/or torque limits from the engine control circuit 40 and/or the hybrid control circuit 60, processing this information to determine one or more appropriate torque requests and/or limits and then transmitting the one or more appropriate torque requests and/or limits to the engine control circuit and/or the hybrid control circuit 60. The engine control circuit 50 and/or hybrid control circuit 60 then apply torque (positive or negative) to the vehicle driveline in accordance with the torque requests and/or limits transmitted by the transmission control circuit 50.

In one embodiment, information, including torque requests and/or limits, is transmitted periodically between the control circuits 40, 50 and 60 via the communications link 48 in the form of messages each containing all or part of the information to be transferred. The information need not be transferred between each pair of the control circuits 40, 50 and 60 with the same frequency. This disclosure contemplates other embodiments in which information is transferred between the control circuits 40, 50 and 60 aperiodically, and/or in a form other than messages. In any case, the exchange of information between the control circuits 40, 50 and 60 will be described for illustrative purposes only in the form of periodic, multiple-message transmissions between the various control circuits 40, 50 and 60.

Illustratively, information transmitted by the engine control circuit 40 to the transmission control circuit 50 via the communications link 48 includes, but need not be limited to, a driver demanded torque message, a net engine torque message and an accelerator pedal percentage message. The driver demanded torque message contains the amount of engine output torque currently demanded by an operator of the vehicle carrying the system 10, which may be demanded via conventional manual manipulation of the accelerator pedal 44 and/or via a conventional cruise control system (not shown) carried by the vehicle. The net engine torque message contains the amount of torque being applied by the engine 12 to the vehicle driveline. The net engine torque may be the same as the driver demanded torque, or may be different from the driver demanded torque in embodiments in which the engine control circuit 40 is executing one or more torque limiting algorithms and/or receives one or more torque limits from an external device or system, such as the transmission control circuit 50, for example, that require limiting the driver demanded torque to a lesser torque value. The accelerator pedal percentage message contains the current accelerator pedal percentage relative to a reference accelerator pedal percentage, e.g., zero %. The driver demanded torque, the net engine torque and the accelerator pedal percentage illustratively form separate messages of each periodic transmission of information made by the engine control circuit 40 to the transmission control circuit 50, although any of these messages may alternatively be transmitted by the engine control circuit 40 to the transmission control circuit 50 only when it changes to a new value. It will be understood that the engine control circuit 40 may be configured to transmit more or less information than just described to the transmission control circuit 50, and that this disclosure contemplates any such alternative transmission of information.

Information transmitted by the transmission control circuit 50 to the engine control circuit 40 via the communications link 48 illustratively includes short-term and long-term torque requests and/or limits as described above. Short-term and long-term torque requests illustratively form separate messages, as do short-term and long-term torque limits, of each periodic transmission made by the transmission control circuit 50 to the engine control circuit 40, although such messages may alternatively be transmitted by the transmission control circuit 50 to the engine control circuit 40 only when they change value. It will be understood that the transmission control circuit 50 may be configured to transmit more or less information than just described to the engine control circuit 40, and that this disclosure contemplates any such alternative transmission of information.

Information transmitted by the engine control circuit 40 to the hybrid control circuit 60 via the communications link 48 illustratively includes an accelerator pedal position value corresponding to a current position of the accelerator pedal 44 relative to a reference accelerator pedal position. The accelerator pedal position value illustratively forms single message of each periodic transmission made by the engine control circuit 40 to the transmission control circuit 50, although the accelerator pedal position message may alternatively be transmitted by the engine control circuit 40 to the hybrid control circuit 60 only when it changes to a new value. It will be understood that the engine control circuit 40 may be configured to transmit more or less information than just described to the hybrid control circuit 60, and that this disclosure contemplates any such alternative transmission of information.

In this illustrative example, the hybrid control circuit 60 does not transmit any information directly to the engine control circuit 40 via the communications link 48. It will be understood, however, that the hybrid control circuit 60 may be configured to transmit one or more messages to the engine control circuit 40, and that this disclosure contemplates any such alternative transmission of information.

Information transmitted by the hybrid control circuit 60 to the transmission control circuit 50 via the communications link 48 illustratively includes an adjusted accelerator pedal value, an actual motor torque percent at motor node value, a desired engine torque adjustment value, a motor reference torque value, a hybrid demand motor torque value and a TCC release request value. These values illustratively form separate messages of each periodic transmission made by the hybrid control circuit 60 to the transmission control circuit 50, although any one or more of the messages may alternatively be transmitted by the hybrid control circuit 60 to the transmission control circuit 50 only when it changes to a new value. It will be understood that the hybrid control circuit 60 may be configured to transmit more or less information than just described to the transmission control circuit 50, and that this disclosure contemplates any such alternative transmission of information.

Figure 3:
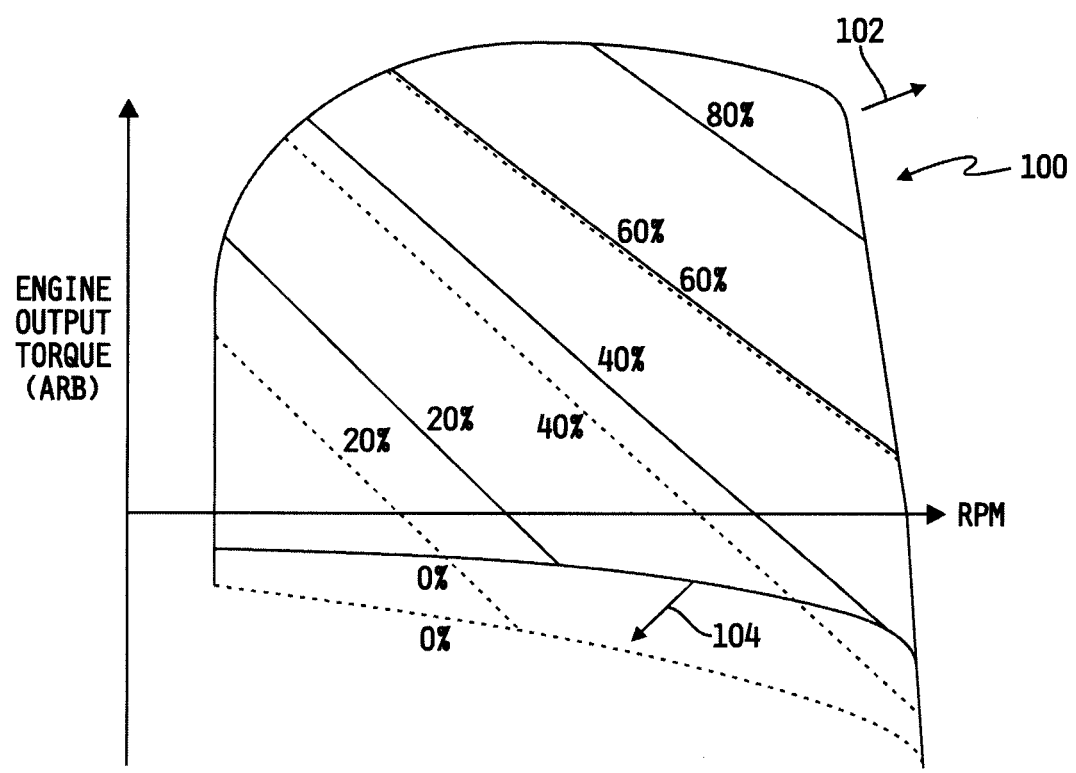
FIG. 3 is a plot of engine output torque vs. engine speed (RPM) showing conventional lines of constant throttle as compared with one illustrative embodiment of modified lines of constant throttle produced by the hybrid control circuit of FIG. 1.

In some embodiments, the adjusted accelerator pedal value produced and transmitted by the hybrid control circuit 60 is a modified version of accelerator pedal position value produced and transmitted by the engine control circuit 40 to the hybrid control circuit 60. In such embodiments, the hybrid control circuit 60 modifies the accelerator pedal position value based on the operation of the hybrid motor/generator 16, 22, 32. For example, the hybrid control circuit 60 may modify the "throttle" value that is conventionally transmitted by the engine control circuit 40 on the communication link 48 to account for using lower actual accelerator pedal position values during hybrid motor regeneration, i.e., re-charging of one or more batteries. Referring to FIG. 3, an example plot 100 of engine output torque vs. RPM is shown wherein the solid diagonal lines represent conventional lines of constant throttle, e.g., accelerator pedal percentage, that increase in value in the direction 102. The example solid diagonal percentage lines in FIG. 3 accordingly represent an accelerator pedal position value schedule, in relation to engine output torque and engine rotational speed, that is transmitted by the engine control circuit 40. In the illustrated example, the dashed diagonal lines represent adjusted lines of constant throttle, e.g., adjusted accelerator pedal percentage, used by the hybrid control circuit 60 is to modify the accelerator pedal position values transmitted by the engine control circuit 40. As illustrated in FIG. 3, separation between the dashed diagonal lines and solid diagonal lines increases in the direction 104. The resulting adjusted accelerator pedal position values transmitted by the hybrid control circuit 60 to the transmission control circuit 50 reflect the lower accelerator pedal position values used during hybrid motor/generator regeneration, i.e., battery recharging. It should be noted that in embodiments in which the hybrid control circuit 60 does not modify the accelerator pedal position-to-engine output torque relationship as illustrated by example in FIG. 3, the engine control circuit 40 need not transmit the accelerator pedal position values to the hybrid control circuit 60 and the hybrid control circuit 60 as the hybrid control circuit 60 generally will not, in such embodiments, transmit modified accelerator pedal percentage values to the transmission control circuit 50.

Illustratively, the actual motor torque percentage at motor node value transmitted by the hybrid control circuit 60 to the transmission control circuit 50 corresponds to the amount of net torque, as a percentage of the motor reference torque (which will be described hereinafter), that is currently being applied to the vehicle driveline by the hybrid motor/generator 16, 22, 32. Positive actual motor torque percentage at motor node values correspond to propulsive torque, and negative actual motor torque percentage at motor node values correspond to braking torque.

The desired engine torque adjustment value transmitted by the hybrid control circuit 60 to the transmission control circuit 50 via the communication link 48 illustratively corresponds to a net change of torque applied by the engine 12 that is desired by the hybrid control circuit 60 at the point, e.g., node, of the driveline to which the hybrid motor/generator 16, 22, 32 is coupled. This value is illustratively included in embodiments, as described hereinabove, in which the engine control circuit 50 is configured to be responsive to one or more torque requests and/or torque limits to modify the amount of torque produced by the engine 12. Generally, the hybrid control circuit 60 is configured to control motor torque, at least in part, as a function of the state-of-charge of one or more batteries as described hereinabove, the hybrid control circuit 60 thus has knowledge of when the hybrid motor/generator 16, 22, 32 is acting as a motor, i.e., is producing positive or propulsive torque, and when the hybrid motor generator 16, 22, 32 is acting as a generator, i.e., is regenerating or recharging, and is therefore applying negative or braking torque to the vehicle driveline. When the hybrid motor/generator 16, 22, 32 is regenerating (recharging batteries), the hybrid control circuit 60 may produce and transmit to the transmission control circuit 50 a positive-valued desired engine torque adjustment value. When the hybrid motor/generator 16, 22, 32 is conversely producing positive, i.e., propulsive, torque, the hybrid control circuit 60 may desire to control the hybrid motor/generator 16, 22, 32 to produce more propulsive torque than it is currently being asked by the transmission control circuit 50 to produce. In such cases, the hybrid control circuit 60 may produce and transmit to the transmission control circuit 50 a negative-valued desired engine torque adjustment value. In either case, the transmission control circuit 50 is responsive to the desired engine torque adjustment value to process the adjustment value to determine a corresponding engine torque request or limit, and to transmit this engine torque request or limit to the engine control circuit 40. The engine control circuit 40 is, in turn, responsive to the transmitted engine torque request or limit to control operation of the engine 12 accordingly.

The motor reference torque value transmitted by the hybrid control circuit 60 to the transmission control circuit 50 via the communication link 48 corresponds to the maximum actual torque produced by the hybrid motor/generator 16, 22, 32. In other words, the motor reference torque value, e.g., in Nm, is the amount of motor torque that corresponds to 100% of actual motor torque present at the point at which the hybrid motor/generator is coupled to the vehicle driveline.

The hybrid demand motor torque value transmitted by the hybrid control circuit 60 to the transmission control circuit 50 via the communication link 48 illustratively corresponds to an amount of net torque that the hybrid control circuit 60 wants the hybrid motor/generator 16, 22, 32 to produce at the point in the vehicle driveline to which the hybrid motor/generator is coupled. The hybrid demand motor torque value differs from the desired engine torque adjustment value in that the desired engine torque adjustment value corresponds to a net amount of torque applied to the point in the vehicle driveline to which the hybrid motor/generator 16, 22, 32 is coupled that the hybrid control circuit 60 would like the engine 12 to increase or decrease, whereas the hybrid demand motor torque value is the net amount of torque that the hybrid control circuit 60 would like the hybrid motor/generator 16, 22, 32 to apply to the point in the vehicle driveline to which the hybrid motor/generator 16, 22, 32 is coupled. Unless the transmission control circuit 50 is limiting, e.g., reducing, torque produced by the hybrid motor/generator 16, 22, 32, as will be described in greater detail hereinafter, the hybrid demand motor torque value will generally be equal to the actual motor torque percent at motor node value. In contrast, if the transmission control circuit 50 is limiting torque produced by the hybrid motor/generator 16, 22, 32, the hybrid demand motor torque value will be greater than the actual motor torque percent at motor node value by the torque limit amount.

The TCC release request value that is transmitted by the hybrid control circuit 60 to the transmission control circuit 50 via the communications link 48 is illustratively a request for the transmission control circuit 50 to control release of the torque converter lockup clutch (not shown in FIG. 1). The transmission control circuit 50 is, in turn, responsive to the TCC release request value to control release, i.e., disengagement, of the torque converter lockup clutch under conditions when it is safe/appropriate to do so.

Information transmitted by the transmission control circuit 50 to the hybrid control circuit 60 via the communications link 48 illustratively includes a driver demanded torque at hybrid node value, a motor torque limit value, an engine control circuit communications status and an engine torque control convention value. These values illustratively form separate messages of each periodic transmission made by the transmission control circuit 50 to the hybrid control circuit 60, although any one or more of the messages may alternatively be transmitted by the transmission control circuit 50 to the hybrid control circuit 60 only when it changes to a new value. It will be understood that the transmission control circuit 50 may be configured to transmit more or less information than just described to the hybrid control circuit 60, and that this disclosure contemplates any such alternative transmission of information.

Illustratively, the driver demanded torque at hybrid node value transmitted by the transmission control circuit 50 to the hybrid control circuit 60 via the communications link 48 corresponds to an amount of torque demanded by the operator of the vehicle, e.g., via either or both of the accelerator pedal and a conventional cruise control system, translated to the point, e.g., node, in the vehicle driveline to which the hybrid motor/generator 16, 22, 32 is coupled. Thus, depending upon the point, i.e., node, in the vehicle driveline to which the hybrid motor/generator 16, 22, 32 is coupled, the driver demanded torque at hybrid node value at this coupling point in the vehicle driveline may or may not include torque multiplication/reduction information. For example, the hybrid motor/generator 16 applies torque directly to the input shaft of the torque converter 15, which is the same driveline node to which the engine 12 applies output torque. In this embodiment, the driver demanded torque at hybrid node value thus corresponds to the amount of output torque being produced by the engine 12. As another example, the hybrid motor/generator 22 applies torque directly to the turbine shaft of the transmission 14 prior to the gear set 28. In this embodiment, the driver demanded torque at hybrid node value includes not only the amount of torque applied by the engine 12 to the input shaft of the torque converter 15, but also any torque multiplication that occurs through the torque converter 15. In this embodiment, the driver demanded torque at the hybrid node, i.e., at the transmission turbine shaft, is thus a product of the output torque produced by the engine 12 and an estimate, computed by the transmission control circuit 50 in a conventional manner, of torque multiplication through the torque converter 15. As yet another example, the hybrid motor/generator 32 applies torque directly to the output shaft of the transmission 14 downstream of the gear set 28. In this embodiment, the driver demanded torque at hybrid node value includes not only the amount of torque applied by the engine 12 to the input shaft of the torque converter 15, but also any torque multiplication that occurs through the torque converter 15 as well as torque reduction that occurs through the gear ratio of the currently engaged gear of the transmission 14. In this embodiment, the driver demanded torque at the hybrid node, i.e., at the transmission output shaft, is thus a product of the output torque produced by the engine 12, an estimate, computed by the transmission control circuit 50 in a conventional manner, of torque multiplication through the torque converter 15 and the gear ratio of the currently engaged gear of the transmission 14, which is known by the transmission control circuit 14. In any case, the driver demanded torque at hybrid node value will typically be reduced by the transmission control circuit 50 by any amount resulting from torque limits imposed by other systems, devices or algorithms, e.g., anti-lock braking system, traction control system, headway controller system, adaptive cruise control system, roll stability system, or the like.

The motor torque limit value transmitted by the transmission control circuit 50 to the hybrid control circuit 60 via the communications link 48 illustratively is a torque limit imposed on the hybrid motor/generator 16, 22, 32 by the transmission control circuit 50. The hybrid control circuit 60 is responsive to the motor torque limit to modify the torque produced by the hybrid motor/generator 16, 22, 32, and in such cases the hybrid demand motor torque value produced by the hybrid control circuit 60 differs from the actual motor torque percent at motor node by the motor torque limit value. The motor torque limit may be provided in units of percent of the motor reference torque value or other suitable units.

The engine control circuit communications status transmitted by the transmission control circuit 50 to the hybrid control circuit 60 via the communications link 48 illustratively indicates whether torque communication between the engine control circuit 40 and the transmission control circuit 50 is available and, if so, whether the torque communication is operating normally. The engine torque control convention value transmitted by the transmission control circuit 50 to the hybrid control circuit 60 via the communications link 48 illustratively identifies the torque convention, e.g., in net torque or in gross torque, used in communications between the engine control circuit 40 and the transmission control circuit 50.

Figure 4:
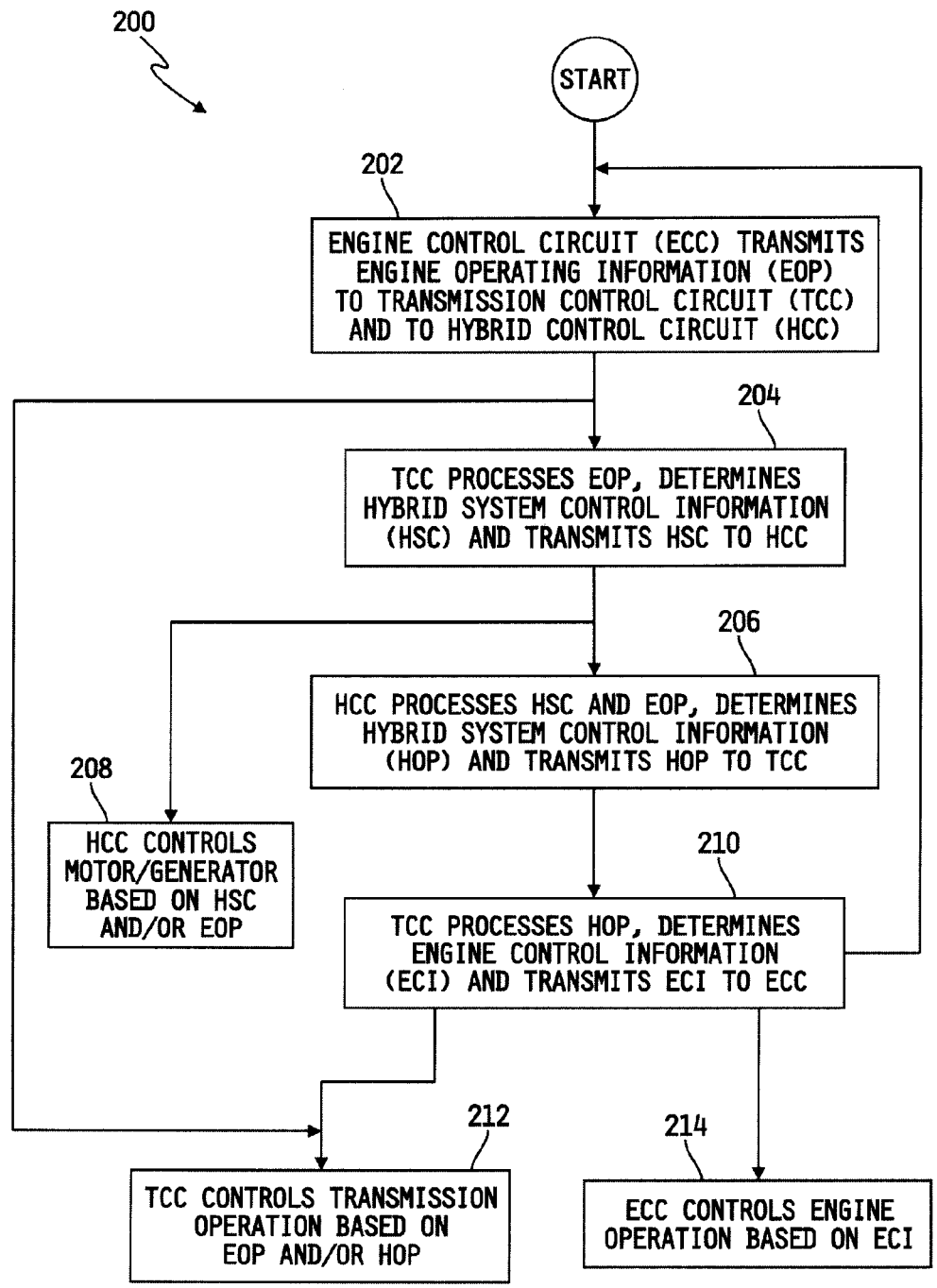
FIG. 4 is a flowchart of one illustrative process for managing torque applied by the engine and/or by the hybrid motor/generator to the vehicle driveline.

Generally, the transmission control circuit 50 is configured to manage torque applied by the engine 12 and by the hybrid motor/generator 16, 22, 32 to the vehicle driveline based on engine torque information transmitted to the transmission control circuit 50 by the engine control circuit 40 and on motor torque information transmitted to the transmission control circuit 50 by the hybrid control circuit 60. Because the transmission control circuit 50 continually receives such information relating to torque applied to the vehicle driveline by the engine 12 and by the hybrid motor/generator 16, 22, 32, the transmission control circuit 50 may operate with conventional friction device control and shift schedule instructions. In other words, the friction device control and shift schedule instructions stored in the memory 55 of the transmission control circuit 50 and executed by the control circuit 50 do not require modification to accommodate inclusion of the hybrid motor/generator 16, 22, 32 in the system 10 or exclusion of the hybrid motor/generator 16, 22, 32 from the system 10. Referring now to FIG. 4, a flowchart is shown illustrating a generalized process 200 for such management of torque applied by the engine 12 and by the hybrid motor/generator 16, 22, 32 to the vehicle driveline based on engine torque information transmitted to the transmission control circuit 50 by the engine control circuit 40 and on motor torque information transmitted to the transmission control circuit 50 by the hybrid control circuit 60. Following a brief description of the process 200 illustrated in FIG. 4, several specific examples of such torque management will be provided.

Referring now to FIG. 4, the process 200 begins at step 202 where the engine control circuit 40 transmits engine operating information (EOP) to the transmission control circuit 50 and to the hybrid control circuit 60, examples of which are described hereinabove. Thereafter at step 204, the transmission control circuit 50 processes the engine operating information, EOP, determines hybrid system control information (HSC) based thereon, examples of which are described hereinabove, and transmits the hybrid system control information, HSC, to the hybrid control system 60. Alternatively or additionally following step 202, the process 200 may advance to step 212 where the transmission control circuit 50 controls operation of the transmission 14 based on the engine operating information, EOP.

Following step 204, the process 200 advances to step 206 where the hybrid control circuit 60 processes the hybrid system control information, HSC, and the engine operating information, EOP, to determine corresponding hybrid system operating information, HOP, examples of which are described hereinabove, and the hybrid control circuit 60 then transmits the hybrid system operating information, HOP, to the transmission control circuit 50. Alternatively or additionally, the process 200 may advance from step 204 to step 208 where the hybrid control circuit 60 control the one or more motors/generators 16, 22, 32 based on the hybrid system control information, HSC, and/or the engine operating information, EOP.

Following step 206, the process 200 advances to step 210 where the transmission control circuit 50 processes the hybrid system operating information, HOP, determines corresponding engine control information, ECI, examples of which are described hereinabove, and then transmits ECI to the engine control circuit 40. The process 200 advances from step 210 to step 212 where the transmission control circuit 50 controls operation of the transmission 14 based on the engine operating information, EOP, and/or on the hybrid system operating information, HOP. Alternatively or additionally, the process 200 advances from step 210 to step 214 where the engine control circuit 40 controls operation of the engine 12 based on the engine control information, ECI. Alternatively or additionally still, the process 200 loops from step 210 back to step 202.

Various control examples torque management in accordance with the flowchart of FIG. 4 will now be provided.

Example 1

In this example, the memory 45 of the engine control circuit 40 has instructions stored therein that are executable by the engine control circuit 40 to transmit to the transmission control circuit 50 via the communications link 48 an engine torque value corresponding to torque applied by the engine to the driveline. The memory 65 of the hybrid control circuit 60 has instructions stored therein that are executable by the hybrid control circuit 60 to transmit to the transmission control circuit 50 a motor torque value corresponding to torque applied by the hybrid motor/generator 16, 22, 32 to the vehicle driveline. The memory 55 of the transmission control circuit 50 has stored therein friction device control and shift schedule instructions that are executable by the transmission control circuit 50 to control operation of the at least one friction device and to control shifting of the transmission respectively. The memory 55 of the transmission control circuit 50 also has stored therein instructions that are executable by the transmission control circuit 50 to manage torque applied to the drive line by the engine 12 and by the hybrid motor/generator 16, 22, 32 based on the engine torque value and the motor torque value such that the friction device control and shift schedule instructions do not require modification to accommodate inclusion of the hybrid motor/generator 16, 22, 32 in the system 10 or exclusion of the hybrid motor/generator 16, 22, 32 from the system 10.

Example 2

The instructions stored in the memory 55 of the transmission control circuit 50 include instructions that are executable by the transmission control circuit 50 to determine and transmit a motor torque limit value to the hybrid control circuit 60 via the communication link 48 when the transmission control circuit 50 determines that the torque produced by the hybrid motor/generator 16, 22, 32 should be reduced. The instructions stored in the memory 65 of the hybrid control circuit 60 include instructions that are executable by the hybrid control circuit 60 to limit torque applied by the hybrid motor/generator 16, 22, 32 to the driveline in accordance with the motor torque limit value.

Example 3

The instructions stored in the memory 55 of the transmission control circuit 50 include instructions that are executable by the transmission control circuit 50 to determine and transmit an engine torque limit value to the engine control circuit 40 via the communication link 48 when the transmission control circuit 50 determines that the torque produced by the engine 12 should be reduced. The instructions stored in the memory 45 of the engine control circuit 45 include instructions that are executable by the engine control circuit 40 to limit torque applied by the engine 12 to the driveline in accordance with the engine torque limit.

Example 4

The instructions stored in the memory 55 of the transmission control circuit 50 include instructions that are executable by the transmission control circuit 50 to process the engine torque value and determine a node torque value corresponding to torque applied to point in the driveline to which the hybrid motor/generator 16, 22, 32 is coupled, and to transmit the node torque value to the hybrid control circuit 60 via the communication link 48. The instructions stored in the memory 65 of the hybrid control circuit 60 include instructions that are executable by the hybrid control circuit 60 to control the hybrid motor/generator 16, 22, 32 to apply torque to the driveline and to determine a torque adjustment value based on the node torque value. The torque adjustment value illustratively corresponds to an amount of torque by which the torque produced by the engine 12 should be modified to take into account the torque being applied by the hybrid motor/generator 16, 22, 32 to the driveline. The hybrid control circuit 60 transmits the torque adjustment value to the transmission control circuit 50. The instructions stored in the memory 55 of the transmission control circuit 50 include instructions that are executable by the transmission control circuit 50 to process the torque adjustment value to determine a corresponding engine torque limit or command, and to transmit the engine torque limit or command to the engine control circuit 40. The instructions stored in the memory 45 of the engine control circuit 40 include instructions that are executable by the engine control circuit 40 to control torque applied by the engine 12 to the driveline in accordance with the engine torque limit or command.

Example 5

The memory 45 of the engine control circuit 40 has instructions stored therein that are executable by the engine control circuit 40 to transmit to the transmission control circuit 50 via the communications link 48 an engine torque value corresponding to torque applied by the engine 12 to the driveline. The transmission control circuit 50 receives one or more torque limit requests from one or more systems other than the hybrid control circuit 60. The memory 55 of the transmission control circuit 50 has instructions stored therein that are executable by the transmission control circuit 50 to determine a modified engine torque value based on the engine torque value and the one or more torque limit requests, and to control operation of the transmission 14 in accordance with the modified engine torque value.

Example 6

The instructions stored in the memory 55 of the transmission control circuit 50 include instructions that are executable by the transmission control circuit 50 to process the modified engine torque value and determine a node torque value corresponding to torque applied to the point in the driveline to which the hybrid motor/generator 16, 22, 32 is coupled, and to transmit the node torque value to the hybrid control circuit 60 via the communication link 48. The instructions stored in the memory 65 of the hybrid control circuit 60 includes instructions that are executable by the hybrid control circuit 60 to control the hybrid motor/generator 16, 22, 32 to apply torque to the driveline and to determine a torque adjustment value based on the node torque value. The torque adjustment value illustratively corresponds to an amount of torque by which the torque produced by the engine 12 should be modified to take into account the torque being applied by the hybrid motor/generator 16, 22, 32 to the driveline. The hybrid control circuit 60 transmits the torque adjustment value to the transmission control circuit 50. The instructions stored in the memory 55 of the transmission control circuit 50 include instructions that are executable by the transmission control circuit 50 to process the torque adjustment value to determine a corresponding engine torque limit or command, and to transmit the engine torque limit or command to the engine control circuit 40. The instructions stored in the memory 45 of the engine control circuit 40 include instructions that are executable by the engine control circuit 40 to control torque applied by the engine 12 to the driveline in accordance with the engine torque limit or command.

Example 7

The instructions stored in the memory 55 of the transmission control circuit 50 include instructions that are executable by the transmission control circuit 50 to determine and transmit a motor torque limit value to the hybrid control circuit 60 via the communication link 48 when the transmission control circuit 50 determines that the torque produced by the hybrid motor/generator 16, 22, 32 should be reduced. The instructions stored in the memory 65 of the hybrid control circuit 60 include instructions that are executable by the hybrid control circuit 60 to limit torque applied by the hybrid motor/generator 16, 22, 32 to the driveline in accordance with the motor torque limit value.

Example 8

The memory 45 of the engine control circuit 40 has instructions stored therein that are executable by the engine control circuit 40 to process the accelerator pedal position signal produced by the accelerator pedal sensor 46 and to transmit a corresponding accelerator pedal position value to the transmission control circuit 50 and to the hybrid control circuit 60 via the communication link 48. The memory 65 of the hybrid control circuit 60 has instructions stored therein that are executable by the hybrid control circuit 60 to process the accelerator pedal position value to produce and transmit to the transmission control circuit 50 via the communication link 48 a modified accelerator pedal position value when the hybrid motor/generator 16, 22, 32 is operating in a battery recharging mode. The memory 55 of the transmission control circuit 50 has stored therein instructions that are executable by the transmission control circuit 50 to control operation of the transmission 14 in accordance with the modified accelerator pedal position value when the hybrid motor/generator 16, 22, 32 transmits the reduced accelerator pedal position value thereto and to otherwise control operation of the transmission 14 in accordance with the accelerator pedal position value transmitted by the engine control circuit 40.

Example 9

The memory 45 of the engine control circuit 40 has instructions stored therein that are executable by the engine control circuit 40 to determine and transmit to the transmission control circuit 50 via the communications link 48 an engine torque value corresponding to torque applied by the engine 12 to the driveline. The memory 55 of the transmission control circuit 50 has stored therein instructions that are executable by the transmission control circuit 50 to determine from the engine torque value and transmit to the hybrid control circuit 60 via the communications link 48 a node torque value corresponding to torque applied to the point in the driveline to which the hybrid motor/generator 16, 22, 32 is coupled. The memory 65 of the hybrid control circuit 60 has instructions stored therein that are executable by the hybrid control circuit 60 to determine a motor torque value corresponding to an amount of motor torque applied by the hybrid motor/generator 16, 22, 32, and to determine from the motor torque value and the node torque value a torque adjustment value corresponding to an amount of torque by which the engine torque value should be modified to account for the amount of motor torque applied by the hybrid motor/generator 16, 22, 32, and to transmit the torque adjustment value to the transmission control circuit 50. The instructions stored in the memory 55 of the transmission control circuit 50 include instructions that are executable by the transmission control circuit 50 to process the torque adjustment value to determine a corresponding engine torque limit or command and to transmit to the engine control circuit 40 via the communications link 48 the engine torque limit or command. The instructions stored in the memory 45 of the engine control circuit 40 include instructions that are executable by the engine control circuit 40 to modify the torque applied by the engine 12 to the driveline in accordance with the engine torque limit or command.

Other examples consistent with the flowchart of FIG. 4 will occur to those skilled in the art, and such other examples are contemplated by this disclosure.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for managing torque in a vehicle driveline coupled to an internal combustion engine and to a hybrid motor/generator, the system comprising:
   a transmission defining at least part of the vehicle driveline, the transmission including at least one electronically controllable friction device,
   a transmission control circuit configured to control operation of the transmission,
   an engine control circuit configured to control operation of the engine, and
   a hybrid control circuit configured to control operation of the hybrid motor/generator,
   wherein the engine control circuit includes a memory having instructions stored therein that are executable by the engine control circuit to provide to the transmission control circuit an engine torque value corresponding to torque applied by the engine to the driveline,
   and wherein the hybrid control circuit includes a memory having instructions stored therein that are executable by the hybrid control circuit to provide to the transmission control circuit a motor torque value corresponding to torque applied by the hybrid motor/generator to the driveline,
   and wherein the transmission control circuit includes a memory having stored therein friction device control and shift schedule instructions that are executable by the transmission control circuit to control operation of the at least one friction device and to control shifting of the transmission respectively, and also having stored therein instructions that are executable by the transmission control circuit to manage torque applied to the drive line by the engine and by the hybrid motor/generator based on the engine torque value and the motor torque value such that the friction device control and shift schedule instructions do not require modification to accommodate inclusion of the hybrid motor/generator in the system or exclusion of the hybrid motor/generator from the system.

2. The system of claim 1 wherein at least two of the transmission control circuit, the engine control circuit and the hybrid control circuit are combined to form a single controller.

3. The system of claim 1 further comprising a communications link coupled to each of the engine control circuit, the transmission control circuit and the hybrid control circuit,
   wherein the engine control circuit, the transmission control circuit and the hybrid control circuit are each configured to communicate with at least one other of the engine control circuit, the transmission control circuit and the hybrid control circuit via the communications link.

4. The system of claim 1 wherein the instructions stored in the memory of the transmission control circuit include instructions that are executable by the transmission control circuit to determine and transmit a motor torque limit value to the hybrid control circuit via the communication link when the transmission control circuit determines that the torque produced by the hybrid motor/generator should be reduced, and wherein the instructions stored in the memory of the hybrid control circuit include instructions that are executable by the hybrid control circuit to limit torque applied by the hybrid motor/generator to the driveline in accordance with the motor torque limit value.

5. The system of claim 1 wherein the instructions stored in the memory of the transmission control circuit include instructions that are executable by the transmission control circuit to determine and provide an engine torque limit value to the engine control circuit when the transmission control circuit determines that the torque produced by the engine should be reduced, and wherein the instructions stored in the memory of the engine control circuit include instructions that are executable by the engine control circuit to limit torque applied by the engine to the driveline in accordance with the engine torque limit.

6. The system of claim 1 wherein the instructions stored in the memory of the transmission control circuit include instructions that are executable by the transmission control circuit to process the engine torque value and determine a driver demanded node torque value corresponding to torque applied to point in the driveline to which the hybrid motor/generator is coupled, and to provide the driver demanded node torque value to the hybrid control circuit.

7. The system of claim 6 wherein the instructions stored in the memory of the hybrid control circuit include instructions that are executable by the hybrid control circuit to control the hybrid motor/generator to apply torque to the driveline and to determine a torque adjustment value based on the node torque value, the torque adjustment value corresponding to an amount of torque by which the torque produced by the engine should be modified to take into account the torque being applied by the hybrid motor/generator to the driveline, and to provide the torque adjustment value to the transmission control circuit.

8. The system of claim 7 wherein the instructions stored in the memory of the transmission control circuit include instructions that are executable by the transmission control circuit to process the torque adjustment value to determine a corresponding engine torque limit or command, and to provide the engine torque limit or command to the engine control circuit.

9. The system of claim 8 wherein the instructions stored in the memory of the engine control circuit include instructions that are executable by the engine control circuit to control torque applied by the engine to the driveline in accordance with the engine torque limit or command.

10. The system of claim 1 wherein the engine includes a rotatable output shaft that is driven by the engine and that is coupled to a rotatable input shaft of the transmission, and wherein the hybrid motor/generator is coupled to the driveline at the input shaft of the transmission.

11. The system of claim 1 wherein the transmission includes a power take off gear, and wherein the hybrid motor/generator is coupled to the driveline at the power take off gear.

12. The system of claim 1 wherein the transmission includes a rotatable output shaft, and wherein the hybrid motor/generator is coupled to the driveline at the output shaft of the transmission.

13. A system for managing torque in a vehicle driveline coupled to an internal combustion engine and to a hybrid motor/generator, the system comprising:

a transmission defining at least part of the vehicle driveline, a transmission control circuit configured to control operation of the transmission, an engine control circuit configured to control operation of the engine, and a hybrid control circuit configured to control operation of the hybrid motor/generator, and wherein the engine control circuit includes a memory having instructions stored therein that are executable by the engine control circuit to provide to the transmission control circuit an engine torque value corresponding to torque applied by the engine to the driveline, and wherein the transmission control circuit receives one or more torque limit requests from one or more systems other than the hybrid control circuit, and wherein the transmission control circuit includes a memory having instructions stored therein that are executable by the transmission control circuit to determine a modified engine torque value based on the engine torque value and the one or more torque limit requests, and to control operation of the transmission in accordance with the modified engine torque value.

14. The system of claim 13 wherein at least two of the transmission control circuit, the engine control circuit and the hybrid control circuit are combined to form a single controller.

15. The system of claim 13 further comprising a communications link coupled to each of the engine control circuit, the transmission control circuit and the hybrid control circuit, wherein the engine control circuit, the transmission control circuit and the hybrid control circuit are each configured to communicate with at least one other of the engine control circuit, the transmission control circuit and the hybrid control circuit via the communications link.

16. The system of claim 13 wherein the instructions stored in the memory of the transmission control circuit include instructions that are executable by the transmission control circuit to process the modified engine torque value and determine a node torque value corresponding to torque applied to the point in the driveline to which the hybrid motor/generator is coupled, and to transmit the node torque value to the hybrid control circuit via the communication link.

17. The system of claim 16 wherein the instructions stored in the memory of the hybrid control circuit includes instructions that are executable by the hybrid control circuit to control the hybrid motor/generator to apply torque to the driveline and to determine a torque adjustment value based on the node torque value, the torque adjustment value corresponding to an amount of torque by which the torque produced by the engine should be modified to take into account the torque being applied by the hybrid motor/generator to the driveline, and to provide the torque adjustment value to the transmission control circuit.

18. The system of claim 17 wherein the instructions stored in the memory of the transmission control circuit include instructions that are executable by the transmission control circuit to process the torque adjustment value to determine a corresponding engine torque limit or command, and to provide the engine torque limit or command to the engine control circuit.

19. The system of claim 18 wherein the instructions stored in the memory of the engine control circuit include instructions that are executable by the engine control circuit to control torque applied by the engine to the driveline in accordance with the engine torque limit or command.

20. The system of claim 19 wherein the instructions stored in the memory of the transmission control circuit include instructions that are executable by the transmission control circuit to determine and provide a motor torque limit value to the hybrid control circuit when the transmission control circuit determines that the torque produced by the hybrid motor/generator should be reduced, and wherein the instructions stored in the memory of the hybrid control circuit include instructions that are executable by the hybrid control circuit to limit torque applied by the hybrid motor/generator to the driveline in accordance with the motor torque limit value.

21. A system for managing torque in a vehicle driveline coupled to an internal combustion engine and to a hybrid motor/generator, the system comprising:

a transmission defining at least part of a vehicle driveline to which the engine and hybrid motor/generator are coupled, an accelerator pedal responsive to driver control to produce an accelerator pedal position signal relative to a reference accelerator pedal position, an engine control circuit configured to control operation of the engine and including an input receiving the accelerator pedal position signal, a transmission control circuit configured to control operation of the transmission, and a hybrid control circuit configured to control operation of the hybrid motor/generator, wherein the engine control circuit includes a memory having instructions stored therein that are executable by the engine control circuit to process the accelerator pedal position signal and to provide a corresponding accelerator pedal position value to the transmission control circuit and to the hybrid control circuit, and wherein the hybrid control circuit includes a memory having instructions stored therein that are executable by the hybrid control circuit to process the accelerator pedal position value to produce and provide to the transmission control circuit a modified accelerator pedal position value when the hybrid motor/generator is operating in a battery recharging mode, and wherein the transmission control circuit includes a memory having stored therein instructions that are executable by the transmission control circuit to control operation of the transmission in accordance with the modified accelerator pedal position value when the hybrid motor/generator transmits the modified accelerator pedal position value thereto and to otherwise control operation of the transmission in accordance with the accelerator pedal position value transmitted by the engine control circuit.

22. A system for controlling operation of a transmission in a vehicle including an internal combustion engine and a hybrid motor/generator, comprising:

a transmission defining at least part of a vehicle driveline to which the engine and hybrid motor/generator are coupled, a transmission control circuit configured to control operation of the transmission, an engine control circuit configured to control operation of the engine, and a hybrid control circuit configured to control operation of the hybrid motor/generator, wherein the engine control circuit includes a memory having instructions stored therein that are executable by the engine control circuit to determine and provide to the transmission control circuit an engine torque value corresponding to torque applied by the engine to the driveline, and wherein the transmission control circuit includes a memory having stored therein instructions that are executable by the transmission control circuit to determine from the engine torque value and provide to the hybrid control circuit a node torque value corresponding to torque applied to the point in the driveline to which the hybrid motor/generator is coupled, and wherein the hybrid control circuit includes a memory having instructions stored therein that are executable by the hybrid control circuit to determine a motor torque value corresponding to an amount of motor torque applied by the hybrid motor/generator, and to determine from the motor torque value and the node torque value a torque adjustment value corresponding to an amount of torque by which the engine torque value should be modified to account for the amount of motor torque applied by the hybrid motor/generator, and to provide the torque adjustment value to the transmission control circuit, and wherein the instructions stored in the memory of the transmission control circuit include instructions that are executable by the transmission control circuit to process the torque adjustment value to determine a corresponding engine torque limit or command and to provide to the engine control circuit the engine torque limit or command, and wherein the instructions stored in the memory of the engine control circuit include instructions that are executable by the engine control circuit to modify the torque applied by the engine to the driveline in accordance with the engine torque limit or command.

23. The system of claim 22 wherein the engine includes a rotatable output shaft that is driven by the engine and that is coupled to a rotatable input shaft of the transmission, and wherein the hybrid motor/generator is coupled to the driveline at the input shaft of the transmission.

24. The system of claim 22 wherein the transmission includes a power take off gear, and wherein the hybrid motor/generator is coupled to the driveline at the power take off gear.

25. The system of claim 22 wherein the transmission includes a rotatable output shaft, and wherein the hybrid motor/generator is coupled to the driveline at the output shaft of the transmission.

* * * * *